United States Patent
Sakai

(12) 
(10) Patent No.: US 9,975,533 B2
(45) Date of Patent: May 22, 2018

(54) NEGATIVE-PRESSURE-TYPE BOOSTER

(71) Applicant: ADVICS CO., LTD., Kariya-shi, Aichi-ken (JP)

(72) Inventor: Tomoyasu Sakai, Kariya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 0 days. days.

(21) Appl. No.: 15/515,969

(22) PCT Filed: Sep. 30, 2015

(86) PCT No.: PCT/JP2015/077764
§ 371 (c)(1),
(2) Date: Mar. 30, 2017

(87) PCT Pub. No.: WO2016/052633
PCT Pub. Date: Apr. 7, 2016

(65) Prior Publication Data
US 2017/0305400 A1 Oct. 26, 2017

(30) Foreign Application Priority Data
Sep. 30, 2014 (JP) ................................. 2014-201538

(51) Int. Cl.
*B60T 13/567* (2006.01)
*B60T 13/565* (2006.01)

(52) U.S. Cl.
CPC ........ *B60T 13/5675* (2013.01); *B60T 13/565* (2013.01)

(58) Field of Classification Search
CPC ............................ B60T 13/5675; B60T 13/565
(Continued)

(56) References Cited

U.S. PATENT DOCUMENTS

| | | | |
|---|---|---|---|
| 9,663,087 B2 * | 5/2017 | Bacardit | B60T 13/567 |
| 2012/0304849 A1 * | 12/2012 | Tanizawa | B60T 13/567 91/376 R |

FOREIGN PATENT DOCUMENTS

| | | | |
|---|---|---|---|
| JP | H 08-290764 A | 11/1996 | |
| JP | H 11-503684 A | 3/1999 | |

(Continued)

OTHER PUBLICATIONS

International Search Report (PCT/ISA/210) dated Dec. 28, 2015, by the Japanese Patent Office as the International Searching Authority for International Application No. PCT/JP2015/077764.

(Continued)

*Primary Examiner* — Todd M Epps
(74) *Attorney, Agent, or Firm* — Buchanan Ingersoll & Rooney PC

(57) ABSTRACT

A negative-pressure-type booster includes: a booster shell attached to a support member of a vehicle; a front shell and a rear shell which constitute the booster shell; and, at the four corners of a flat part of the rear shell, linking bolts having affixed thereto protruding parts that each protrude rearward from the flat part, the protruding parts being passed through continuous connecting holes in the support member, the negative-pressure-type booster characterized in that the linking bolts are composed of upper linking bolts arranged to the upper side of the center axis of the booster shell and lower linking bolts arranged to the lower side of the center axis of the booster shell, the protruding part of either of the upper linking bolts extending farther rearward than the protruding part of the other upper linking bolt and the respective protruding parts of the lower linking bolts.

8 Claims, 2 Drawing Sheets

(58) Field of Classification Search
USPC .................. 92/169.4; 91/376 R; 248/205.1
See application file for complete search history.

(56) References Cited

FOREIGN PATENT DOCUMENTS

| | | |
|---|---|---|
| JP | 2012-250663 A | 12/2012 |
| JP | 2014-056514 A | 3/2014 |

OTHER PUBLICATIONS

Written Opinion (PCT/ISA/237) dated Dec. 28, 2015, by the Japanese Patent Office as the International Searching Authority for International Application No. PCT/JP2015/077764.

* cited by examiner

[Fig.1]
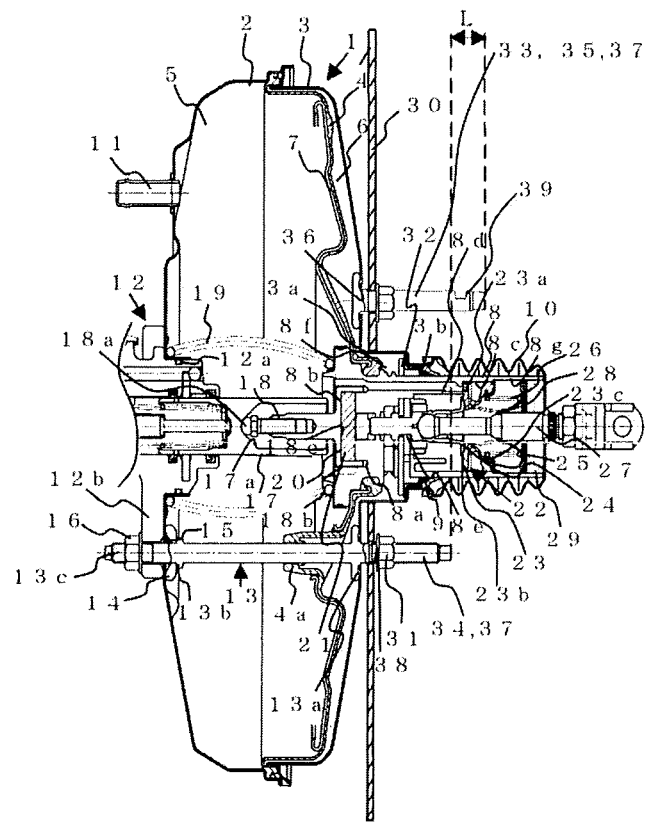
[Fig.2]
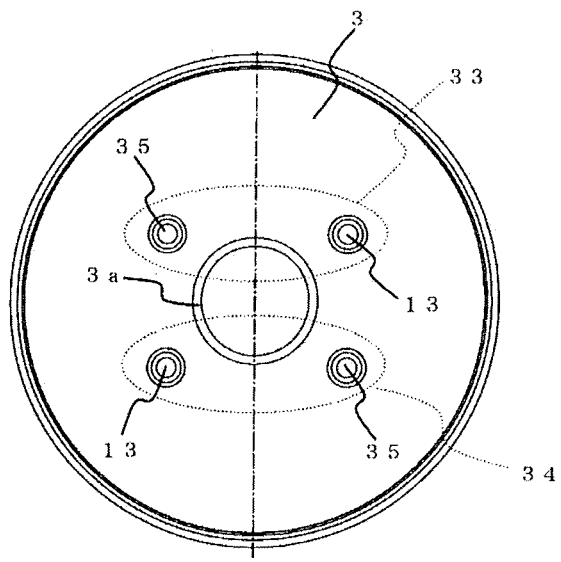

[Fig.3]
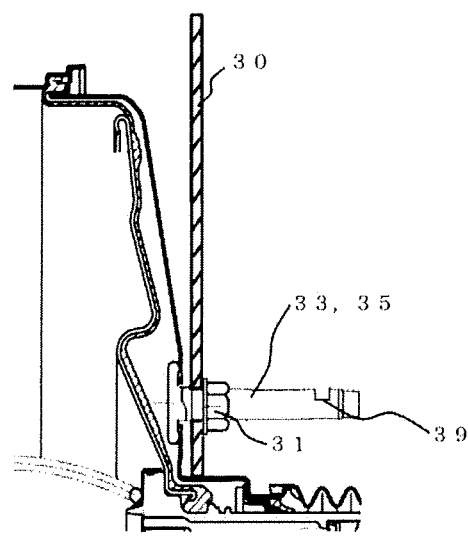

NEGATIVE-PRESSURE-TYPE BOOSTER

TECHNICAL FIELD

The present invention relates to a negative-pressure-type booster employed in a vehicle braking device.

BACKGROUND ART

As one of negative-pressure-type boosters (boosters) of this type, a negative-pressure-type booster including a booster shell configured by a front shell and a rear shell and a diaphragm disposed between the front shell and the rear shell to partition the interior of the booster shell into a constant-pressure chamber (negative-pressure chamber) and a variable-pressure chamber, the constant-pressure chamber being configured to be formed between the front shell and the diaphragm and to be connected to a negative-pressure source, and the variable-pressure chamber being configured to be formed between the rear shell and the diaphragm and to be connected to the negative-pressure chamber or atmospheric air is known. For example, an example of the negative-pressure-type booster is described in the following Patent Literature 1.

CITATIONS LIST

Patent Literature

Patent Literature 1: Japanese Unexamined Patent Publication No. 2012-250663

On the rear shell side of the booster described in the Patent Literature 1, bolts having equal lengths are inserted into the four corners of the rear shell, and parts of the bolts protruding from the rear shell are inserted into connecting holes of a support member of a vehicle to attach the booster to the support member of the vehicle. Furthermore, threaded parts formed in the parts of the bolts protruding from the support member are meshed with nuts from the inside of the vehicle to attach the booster to the support member of the vehicle.

SUMMARY OF INVENTION

Technical Problems

Generally, when a booster is to be attached to a vehicle, as described above, bolts protruding from a rear shell are inserted from an engine room side into connecting holes of a support member of a vehicle, and, thereafter, the bolts are meshed with nuts from a vehicle room side. In this manner, the booster is completely attached to the support member of the vehicle.

However, in the configuration according to Patent Literature 1, after the bolts of the booster are inserted from the engine room side into the support member of the vehicle, the weight of the booster may allow the bolts to fall out of the connecting holes of the support member of the vehicle so as to disadvantageously disengage the booster from the support member of the vehicle. In this manner, for example, the step of supporting the booster to prevent the booster from being disengaged after the booster is inserted into the support member of the vehicle is required to deteriorate the assembly workability of the booster to the support member of the vehicle.

The present invention has been made in consideration of the above circumstances, and aims at providing a negative-pressure-type booster having good assembly workability when a booster is attached to a support member of a vehicle.

Solutions to Problems

The present invention, in order to solve the above problems, provides a negative-pressure-type booster according to claim 1 including a booster shell attached to a support member of a vehicle, a front shell and a rear shell configuring the booster shell, and, at four corners of a flat part of the rear shell, and linking bolts to which protruding parts protruding rearward from the flat part are fixed, the protruding parts being inserted into connecting holes of the support member, wherein the linking bolts include upper linking bolts disposed on an upper side of a center axis of the booster shell and lower linking bolts disposed on a lower side of the center axis of the booster shell, the protruding part of any one of the upper linking bolts extends more rearward than the protruding part of the other upper linking bolt and the protruding parts of the lower linking bolts.

The negative-pressure-type booster according to claim 2 wherein, in claim 1, a lower linking bolt located on a diagonal line of one of the upper linking bolts is formed such that the lower linking bolt has a length equal to that of one of the upper linking bolts.

The negative-pressure-type booster according to claim 3 wherein, in claim 1 or 2, in one of the upper linking bolts, a cutout caught by the support member of the vehicle when the upper linking bolt is inserted into the support member is formed.

After the linking bolts of the booster shell are inserted into the support members of the vehicle, the weight of the booster shell may allow the linking bolts to fall out of the support member of the vehicle. In contrast to this, according to the invention of claim 1, one of the upper linking bolts is an extending bolt formed to have a length larger than that of the other upper linking bolt and the lower linking bolt located in a vertical direction of the upper linking bolt. In this manner, the extending bolt is formed to be longer as described above to make it difficult to allow the bolt to fall out of the connecting hole of the support member. Furthermore, when the linking bolts almost fall out of the support member, a contact portion between the lower linking bolts and the connecting holes of the support member acts as a supporting point to increase press force at a contact portion between the extending bolt and the connecting hole of the support member. Thus, in comparison with a case wherein the same bolts are used as upper linking bolts and lower linking bolts, the booster shell can be prevented from being disengaged from the support member of the vehicle. More specifically, since the step of preventing a booster shell from being disengaged is not required, assembly workability of the booster shell to the support member of the vehicle can be improved.

According to the invention of claim 2, when the booster shell is almost disengaged, the lower linking bolts each having a length equal to that of the extending bolt are caught by upper ends of lower connecting holes of the support member. For this reason, in comparison with a case where an extending bolt is only caught by an upper connecting hole of the support member, the booster shell can be more preferably prevented from being disengaged.

According to the invention of claim 3, since the cutout is formed in an extending part of the extending bolt, when the booster is to be disengaged, the cutout of the extending bolt is caught by the upper end of the linking hole of the support member of the vehicle. In this manner, the booster can be more preferably prevented from being disengaged from the support member of the vehicle.

BRIEF DESCRIPTION OF DRAWINGS

FIG. 1 is a sectional view showing an embodiment of a negative-pressure-type booster according to the present invention.

FIG. 2 is a front view of a rear shell according to the present invention.

FIG. 3 is an enlarged view of a periphery of an extending bolt according to the present invention.

DESCRIPTION OF EMBODIMENTS

Embodiments of the present invention will be described below in more detail. However, the present invention is not limited to the following embodiments as long as the present invention does not depart from the spirit and scope thereof.

A first embodiment in a tie-rod negative-pressure-type booster serving as a negative-pressure-type booster (booster) according to the present invention will be described below with reference to the accompanying drawings. As shown in FIG. 1, a booster shell 1 includes a front shell 2 and a rear shell 3, and a flexible diaphragm 4 is airtightly clamped between both the shells 2 and 3 with beads on the outer periphery of the diaphragm 4 to partition the interior of the booster shell into a constant-pressure chamber 5 and a variable-pressure chamber 6. A disk-like plate 7 is superposed on the diaphragm 4 on the constant-pressure chamber 5 side, and the outer peripheral surface of a distal end of a piston is airtightly fixed to the diaphragm 4 and the plate 7, and the front side of the piston 8 is exposed to the constant-pressure chamber 5. A central part of the rear shell 3 is bent outward, a cylindrical protruding part 3a is extendedly provided rearward, and a through hole 3b is formed on an axial line.

The piston 8 penetrates the through hole 3b and protrudes rearward from the protruding part 3a of the booster shell 1, and a seal 9 is interposed between the inner peripheral surface of the through hole 3b and the outer peripheral surface of the piston 8 to block the variable-pressure chamber 6 from atmospheric air. Bellows 10 are fixed between the rear end edge of the piston 8 and the periphery of the through hole 3b to cover the outer periphery of the piston 8. A negative-pressure applying pipe 11 is attached to the front shell 2, and the constant-pressure chamber 5 communicates with an intake manifold (not shown) of an engine through the negative-pressure applying pipe 11 and kept at a negative pressure.

Reference numeral 12 denotes a master cylinder. A distal end part 12a penetrates a central hole formed in the front shell 2 and airtightly protrudes into the constant-pressure chamber 5, and a flange part 12b contacts with the rear surface of the front shell 2. The front shell 2 and the rear shell 3 are coupled to each other with a tie-rod bolt 13 extending in parallel with an axial line of the booster shell 1 including both the shells at almost an intermediate position between the axial line and the outer periphery of the booster shell 1, and fixed to the master cylinder 12. More specifically, the tie-rod bolt 13 is fixed to the rear shell 3 such that a large-diameter attaching seat 13a is brought into airtight contact with the inner surface of the rear shall 3 in the variable-pressure chamber 6 and a rear end of the bolt 13 penetrating the rear shall 3 and extending rearward is caulked toward the outer surface of the rear shell 3. An annular flange 13b is disposed on the tie-rod bolt 13 near the inner surface of the front shell 2, a washer 14 being in contact with the flange 13b is fitted on a distal end part 13c extending more forward than the flange 13b, a seal 15 tightly fitted on the distal end part 13c is pressed against the inner surface of the front shell 2 with the washer 14, and the tie-rod bolt 13 airtightly penetrates the front shell 2 and protrudes forward.

The distal end part 13c penetrates a linking hole formed in the flange part 12b of a master cylinder 12, the front shell 2 and the flange part 12b are clamped between a nut 16 screwed on the distal end and the washer 14 to fix the master cylinder 12 to the booster shell 1 and to draw and couple the front shell 2 and the rear shell 3 to each other. Sliding holes of seal parts 4a disposed on the diaphragm 4 are airtightly fitted in the tie-rod bolts 13 such that the sliding holes can be slid on the tie-rod bolts 13 so as to keep the airtight partition between the constant-pressure chamber 5 and the variable-pressure chamber 6. As shown in FIG. 2, in the embodiment, insertion holes 36 are formed at four corners of a flat part of the rear shell 3. The insertion holes 36 are disposed such that, when the booster is attached to a support member 30 of a vehicle, a total of four linking bolts including two upper linking bolts 33 located on an upper side and two lower linking bolts 34 located on a lower side protrude (protruding parts 37). One (right side on the drawing) of the upper linking bolts 33 is the tie-rod bolt 13 described above, and the other (left side on the drawing) is a non-tie-rod bolt. The tie-rod bolt 13 is disposed as the lower linking bolt 34 located on a diagonal line of an extending bolt 35 of the upper linking bolt 33, and, on the right of the tie-rod bolt 13, a non-tie-rod bolt is disposed. The non-tie-rod bolts including the upper linking bolt 33 and the lower linking bolt 34 are the extending bolts 35 each having the protruding part 37 longer than that of the other (tie-rod bolt 13) of the upper linking bolts. Furthermore, as shown in FIG. 1 and FIG. 3, a protruding part 38 of the extending bolt 35 has a cutout 39 formed by cutting out the protruding part 38.

Furthermore, the same linking bolts are disposed as each of the upper linking bolts 33 and each of the lower linking bolt 34 disposed on the diagonal line of the corresponding upper linking bolt 33 such that the upper linking bolt 33 and the lower linking bolt 34 have equal lengths. More specifically, the tie-rod bolt 13 serving as the lower linking bolt 34 is disposed on the lower side of the extending bolt 35 serving as the upper linking bolt 33, and the other linking bolts are reversely disposed. The protruding parts 37 of the upper linking bolts 33 and the lower linking bolts 34 protruding from the rear shell are inserted into the connecting holes 38 (for example, a diameter of 10 mm) of the support member 30 of the vehicle. At this time, the length (for example, 30 mm) of the protruding part 37 of the extending bolt 35 is set on the basis of an intercentral distance (for example, 60 mm) of upper and lower connecting holes 38 of the support member 30. A thread is formed on the protruding part 37, and a nut 31 is screwed on the protruding part 37 from the vehicle inside of the support member 30 to attach the booster shell 1 to the vehicle.

Reference numeral 17 denotes a master piston airtightly penetrating the front shell 2. The master piston 17 is fitted in the master cylinder 12 such that the master piston 17 can be slid forward and rearward, and protrudes from a distal end part 12a of the master cylinder 12 into the constant-pressure chamber 5 to extend to almost the front-end surface of the piston 8. An output rod 18 is interposed between the piston 8 and the master piston 17 such that the piston 8 transmits forward movement of the diaphragm 4 based on a difference between pressures in the constant-pressure chamber 5 and the variable-pressure chamber 6 to the master piston 17 through the output rod 18. More specifically, a linking hole 17a is formed in the master piston 17 from a rear-end surface in an axial direction, and a bottom part of the linking hole 17a is formed to have a conical shape rounded at the top. At the conical bottom part of the linking hole 17a, a distal end of a rod part 18a provided to extend toward the front of the output rod 18 is aligned and brought into contact with the bottom part such that the distal end can be relatively bent in the axial direction. An annular projection 18b formed at the rear end of the output rod 18 is fitted in an annular concave groove 8a formed rearward from the front-end surface in the piston 8 such that the annular projection 18b can relatively move in the axial direction. A return spring 19 is interposed between the front shell 2 and the front-end surface of the piston 8 to bias the piston 8 rearward.

A difference between pressures in both the chambers 5 and 6 is generated depending on stepping force acting on a brake pedal (not shown) by a driver. A reaction mechanism 20 which feeds back relative movement of the diaphragm 4, consequently, the piston 8 with respect to the output rod 18 on the basis of the pressure difference is configured such that a disk-like reaction-force member 21 made of an elastic material is housed in a reaction-force chamber 18c surrounded by the annular projection 18b of the output rod 18, the reaction-force member 21 is clamped between a reaction-force end face 8b surrounded by the annular concave groove 8a of the piston 8 and the bottom surface of the reaction-force chamber 18c, and the piston 8 is compressively transformed depending on force pressing the output rod 18, consequently, the master piston 17.

Reference numeral 22 denotes a valve mechanism which switches the variable-pressure chamber 6 to cause the variable-pressure chamber 6 to communicate with atmospheric air or the constant-pressure chamber 5 and which is built in the piston 8. An annular control valve disk 23 is slidably fitted in a valve hole 8c formed at the central portion of the piston 8 in the axial direction. An annular negative-pressure valve opening/closing unit 23a disposed at the distal end of the control valve disk 23 detachably contacts with a negative-pressure valve 8d annularly extending from the bottom of the valve hole 8c. A concave part formed inside the negative-pressure valve 8d communicates with the variable-pressure chamber 6 through a path 8e formed in the piston 8 in a radial direction and opened in the outer peripheral surface of the piston 8 in front of the seal 9. A communication path 8f opening in a front end face of the piston 8 is formed in a portion where the outer periphery of the negative-pressure valve 8d is in contact with the negative-pressure valve opening/closing unit 23a. When the negative-pressure valve opening/closing unit 23a comes away from the negative-pressure valve 8d, a negative pressure is applied in the variable-pressure chamber 6.

An atmospheric-air valve opening/closing unit 23b is disposed on the control valve disk 23 at a position more rearward than the negative-pressure valve opening/closing unit 23a and detachably contacts with the rear-end face of an atmospheric-air valve disk 24. When the atmospheric-air valve opening/closing unit 23b comes away from the atmospheric-air valve disk 24, atmospheric air is fed into the variable-pressure chamber 6 through a center hole of the control valve disk 23, the concave part formed inside the negative-pressure valve 8d, and the path formed in the piston 8 in the radial direction. The rear end of the control valve disk 23 is coupled to an annular seal holder 25 with bellows 23c which allows the control valve disk 23 to move in the axial direction, the seal holder 25 is fitted in an inlet hole 8g extending from the valve hole 8c to the rear-end face of the piston 8 and pressed against a shoulder portion of the valve hole 8c by a compression spring 26. An input rod 27 coupled to a brake pedal (not shown) is coupled to the atmospheric-air valve disk 24 through the inlet hole 8g on the inner side of the atmospheric-air valve 24. The compression spring 26 is interposed between the rear-end face of the seal holder 25 and a spring bearing 28 being in contact with the shoulder portion of the input rod 27. The compression spring 26 is interposed between the front-end face of the seal holder 25 and the rear-end face of the control valve disk 23 to bias the control valve disk 23 forward so as to bring the negative-pressure valve opening/closing unit 23a and the atmospheric-air valve opening/closing unit 23b into contact with the negative-pressure valve 8d and the atmospheric-air valve disk 24. An air filter 29 which the input rod 27 airtightly penetrates is fixed to the opening of the inlet hole 8g.

An operation of the negative-pressure-type booster according to the embodiment described above will be described below. When the brake pedal (not shown) is stepped on to advance the atmospheric-air valve disk 24 through the input rod 27 against the spring force of the compression spring 26 with reference to the piston 8, the atmospheric-air valve disk 24 is separated from the atmospheric-air valve opening/closing unit 23b of the control valve disk 23, and atmospheric air filtered through the air filter 29 flows into the variable-pressure chamber 6 through the path 8e. The difference between the pressures in the variable-pressure chamber 6 and the constant-pressure chamber 5 allows the diaphragm 4, the plate 7, and the piston 8 to move forward, the output rod 18 is advanced by the piston 8 through the reaction-force member 21 of the reaction mechanism 20, the master piston is pushed and moved by the output rod 18, and a brake oil pressure depending on stepping force acting on the brake pedal is generated in the master cylinder 12.

The piston 8 elastically deforms the reaction-force member 21 by operating force applied to the diaphragm 4 and depending on the pressure difference in both the chambers to push and move the master piston 17 through the output rod 18 and relatively advances with reference to the atmospheric-air valve disk 24, and the control valve disk 23 is biased forward by the compression spring 26 and advances together with the piston 8. When the piston 8 presses the output rod 18 with operating force equivalent to the stepping force of the brake pedal, the atmospheric-air valve opening/closing unit 23b contacts with the atmospheric-air valve disk 24 to block the communication between the atmospheric air and the variable-pressure chamber 6 to hold a desired brake oil pressure. At this time, stepping force on the brake pedal is transmitted from a distal-end shaft of the atmospheric-air valve disk 24 through the input rod 27 to the reaction-force member 21, and the reaction-force member 21 is elastically deformed depending on the stepping force. For this reason, the driver can feel reaction force.

When the brake pedal (not shown) is released, the atmospheric-air valve disk 24 is moved rearward by the spring force of the compression spring 26 with reference to the piston 8, and the atmospheric-air valve disk 24 presses the atmospheric-air valve opening/closing unit 23b to relatively move the control valve disk 23 rearward against the spring force of the compression spring 26 with reference to the piston 8, and the annular negative-pressure valve opening/closing unit 23a is separated from the negative pressure valve 8d. In this manner, the negative pressure in the constant-pressure chamber 5 is applied in the variable-pressure chamber 6 through the communication path 8*f* and the path 8*e* to eliminate the difference between the pressures in the constant-pressure chamber 5 and the variable-pressure chamber 6, and the piston 8, the plate 7, and the diaphragm 4 are moved rearward by the spring force of the return spring 19 to eliminate an oil pressure in the master cylinder. The atmospheric-air valve disk 24 stops when a stop member 32 contacts with the periphery of a communication hole 3*b* of the rear shell 3 to stop, and the piston 8 contacts with the stop member 32 to stop. In this manner, the negative-pressure valve 8*d* contacts with the negative-pressure valve opening/closing unit 23*a* to block the communication between the constant-pressure chamber 5 and the variable-pressure chamber 6.

According to the above configuration, one of the upper linking bolts 33 corresponds to the extending bolt 35 which is formed to have a length larger than that of the other upper linking bolt 33 of the upper linking bolts and the lower linking bolt 34 located at a position vertical to the upper linking bolt 33. In this manner, the extending bolt 35 is formed as described above to make it difficult to allow the bolt 35 to fall out of the connecting hole 38 of the support member 30. Furthermore, when the linking bolts 33 and 34 almost fall out of the support member 30, a contact portion between the lower linking bolt 34 and the connecting hole 38 of the support member 30 acts as a supporting point to increase press force at a contact portion between the extending bolt 35 and the connecting hole 38 of the support member 30. Thus, in comparison with the case in which the same bolts are used as the upper linking bolts 33 and the lower linking bolts 34, the booster shell 1 can be prevented from being disengaged from the support member 30 of the vehicle. More specifically, since the step of preventing the booster shell 1 from being disengaged is not required, assembly workability of the booster shell 1 to the support member 30 of the vehicle can be improved.

The embodiment has described a tie-rod booster. However, the present invention can also be applied to a negative-pressure-type booster except for the tie-rod booster, and the operating effect described above can be exerted.

The invention claimed is:

1. A negative-pressure-type booster comprising:
   a booster shell attached to a support member of a vehicle;
   a front shell and a rear shell configuring the booster shell; and
   at four corners of a flat part of the rear shell, linking bolts to which protruding parts protruding rearward from the flat part are fixed, the protruding parts being inserted into connecting holes of the support member, wherein
   the linking bolts include upper linking bolts disposed on an upper side of a center axis of the booster shell and lower linking bolts disposed on a lower side of the center axis of the booster shell,
   the protruding part of any one of the upper linking bolts extends more rearward than the protruding part of the other upper linking bolt and the protruding parts of the lower linking bolts.

2. The negative-pressure-type booster according to claim 1, wherein the lower linking bolt located on a diagonal line of the one of the upper linking bolts is formed such that the lower linking bolt has a length equal to that of the one of the upper linking bolts.

3. The negative-pressure-type booster according to claim 1, wherein, in the one of the upper linking bolts, a cutout caught by the support member of the vehicle when the upper linking bolt is inserted into the support member is formed.

4. The negative-pressure-type booster according to claim 2, wherein, in the one of the upper linking bolts, a cutout caught by the support member of the vehicle when the upper linking bolt is inserted into the support member is formed.

5. A negative-pressure-type booster comprising:
   a front shell and a rear shell constituting a booster shell;
   the booster shell being attached to a support member of a vehicle; and
   at four corners of a flat part of the rear shell, linking bolts to which protruding parts protruding rearward from the flat part are fixed, the protruding parts being inserted into connecting holes of the support member, wherein
   the linking bolts include upper linking bolts disposed on an upper side of a center axis of the booster shell and lower linking bolts disposed on a lower side of the center axis of the booster shell,
   the protruding part of any one of the upper linking bolts extends more rearward than the protruding part of the other upper linking bolt and also extends more rearward than the protruding part of at least one of the lower linking bolts.

6. The negative-pressure-type booster according to claim 5, wherein the lower linking bolt located on a diagonal line of the one of the upper linking bolts has a length equal to that of the one of the upper linking bolts.

7. The negative-pressure-type booster according to claim 6, wherein the one of the upper linking bolts includes a cutout caught by the support member of the vehicle when the upper linking bolt is inserted into the support member.

8. The negative-pressure-type booster according to claim 5, wherein the one of the upper linking bolts includes a cutout caught by the support member of the vehicle when the upper linking bolt is inserted into the support member.

* * * * *